(12) United States Patent
DelVecchio

(10) Patent No.: US 6,233,861 B1
(45) Date of Patent: May 22, 2001

(54) UNITARY CONTAINER FOR A GAME HUNTING LURE

(76) Inventor: David M. DelVecchio, 1215 Mosely Rd., Victor, NY (US) 14564

( * ) Notice: Subject to any disclaimer, the term of this patent is extended or adjusted under 35 U.S.C. 154(b) by 0 days.

(21) Appl. No.: 09/363,807

(22) Filed: Jul. 30, 1999

(51) Int. Cl.[7] .................................................. A01M 31/06
(52) U.S. Cl. .................................................. 43/1; 43/132.1
(58) Field of Search ............................. 43/1, 124, 132.1; 239/47, 58

(56) References Cited

U.S. PATENT DOCUMENTS

| | | | |
|---|---|---|---|
| 4,747,539 | * 5/1988 | Spector | 239/56 |
| 5,000,383 | * 3/1991 | Van Der Heijden | 239/47 |
| 5,325,626 | * 7/1994 | Jackson | 43/124 |
| 5,528,854 | * 6/1996 | Antonali | 43/132.1 |
| 5,611,165 | * 3/1997 | Blaha | 43/1 |
| 5,746,021 | * 5/1998 | Green | 43/132.1 |
| 5,857,281 | * 1/1999 | Bergquist | 43/1 |
| 5,870,853 | * 2/1999 | Williams | 43/132.1 |
| 5,873,193 | * 2/1999 | Jensen | 43/132.1 |
| 5,918,410 | * 7/1999 | Knuppel | 43/132.1 |
| 5,953,855 | * 9/1999 | Edwards | 43/132.1 |
| 6,003,266 | * 12/1999 | Woodruff | 43/124 |

\* cited by examiner

*Primary Examiner*—Kurt Rowan

(57) ABSTRACT

A unitary container for a game hunting lure. The unitary container includes a body member, forming a housing adapted to receive a game hunting lure, having a closed end and an open end. The open end of the body member is selectively closed by a closure mechanism. A connector, integrally formed with the body member and the closure mechanism, provides for the interconnection thereof. A hanger, integrally formed as part of the unitary container, is provided for hanging the body member at a desired elevated location; and a mechanism, integrally formed as part of the unitary container, is provided for locating the body member at a desired ground location.

6 Claims, 2 Drawing Sheets

UNITARY CONTAINER FOR A GAME HUNTING LURE

BACKGROUND OF THE INVENTION

The present invention relates in general to game hunting lures, and more particularly to a unitary container for a game hunting lure which makes it convenient to carry a lure and set out such lure for attracting game.

It will be appreciated that one popular outdoor recreational pastime is game hunting. Game hunting may be carried out for supplying food or controlling game population, or it may be done just for sporting purposes. While game hunting may be accomplished using firearms, bow-and-arrows, or other suitable weapons, success is generally predicated upon locating the game to be hunted and luring the game to a convenient spot for harvesting.

It is well known that a prime mechanism for luring game is to utilize the acuity of their sense of smell. In order to use this keen sense of smell, it is common practice to set out lures which have had a particular scent applied thereto. The applied scent may be that of an attracting lure such as that of a female in estrus, or alternatively may be a scent which masks human odors that might otherwise tend to frighten off the game.

One well known type of lure includes a cotton pad to which a specific scent favored by the particular hunter has been applied. The cotton pad is carried in a container with a removable lid. The container is set out at a desired outdoor location frequented by the game being hunted, and the lid is removed. The desired location may be on the ground or at an elevation, such as in a tree for example. Accordingly, add-on devices have been attached to the containers to make them readily placed in the ground or hung from trees. These add-on devices are cumbersome to handle and do not reliably provide for their intended function. That is, they require undesirable additional handling, and they tend to get lost or break.

SUMMARY OF THE INVENTION

In view of the foregoing discussion, this invention is directed to a unitary container for a game hunting lure which provides for ready placement in the ground or hanging from an elevated location. The unitary container includes a body member, forming a housing adapted to receive a game hunting lure, having a closed end and an open end. The open end of the body member is selectively closed by a closure mechanism. A connector, integrally formed with the body member and the closure mechanism, provides for the interconnection thereof. A hanger, integrally formed as part of the unitary container, is provided for hanging the body member at a desired elevated location; and a mechanism, integrally formed as part of the unitary container, is provided for locating the body member at a desired ground location.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which.

DETAILED DESCRIPTION OF THE INVENTION

Figure 1:
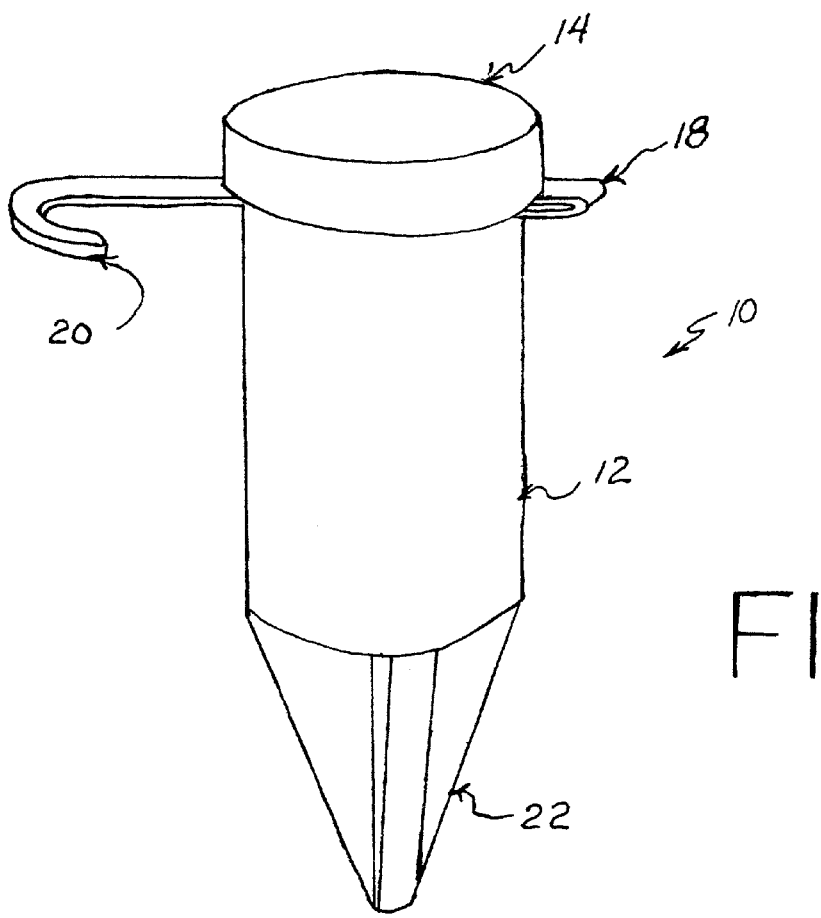
FIG. 1 is an overall view, in perspective, of the unitary container for a game hunting lure, according to this invention.

Referring now to the accompanying drawings, a unitary container, according to this invention, for a game hunting lure is shown, the unitary container being designated generally by the numeral 10. The unitary container 10 includes a body member 12 forming a housing having a closed end 12a and an open end 12b. The housing of the body member is adapted to receive and retain the hunting lure (designated as element 30 in FIG. 3, and as described below). While the body member is preferably substantially cylindrical in shape (see FIG. 1), other suitable cross-sectional configurations may be utilized with this invention. The open end 12b of the housing formed by the body member 12 is selectively closed by a closure mechanism 14. The closure mechanism 14 includes a lid 16 having a complimentary configuration with the open end 12b of the body member. A rim 12c extending outwardly from the body member 12, spaced from the open end 12b, may be engagable by a sealing lip 16a formed on the interior edge of the lid 16. The inter-engagement of the rim 12c and lip 16a assures that the unitary container 10 will remain sealed until it is desired to open the container.

Figure 2:
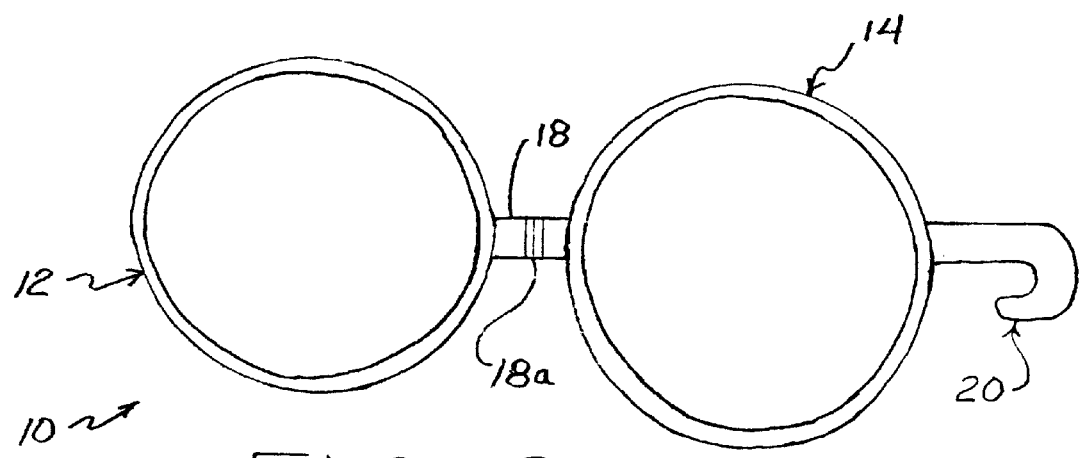
FIG. 2 is a top plan view of the unitary container for a game hunting lure as shown in FIG. 1, with the cap therefor in an open position.
Figure 3:
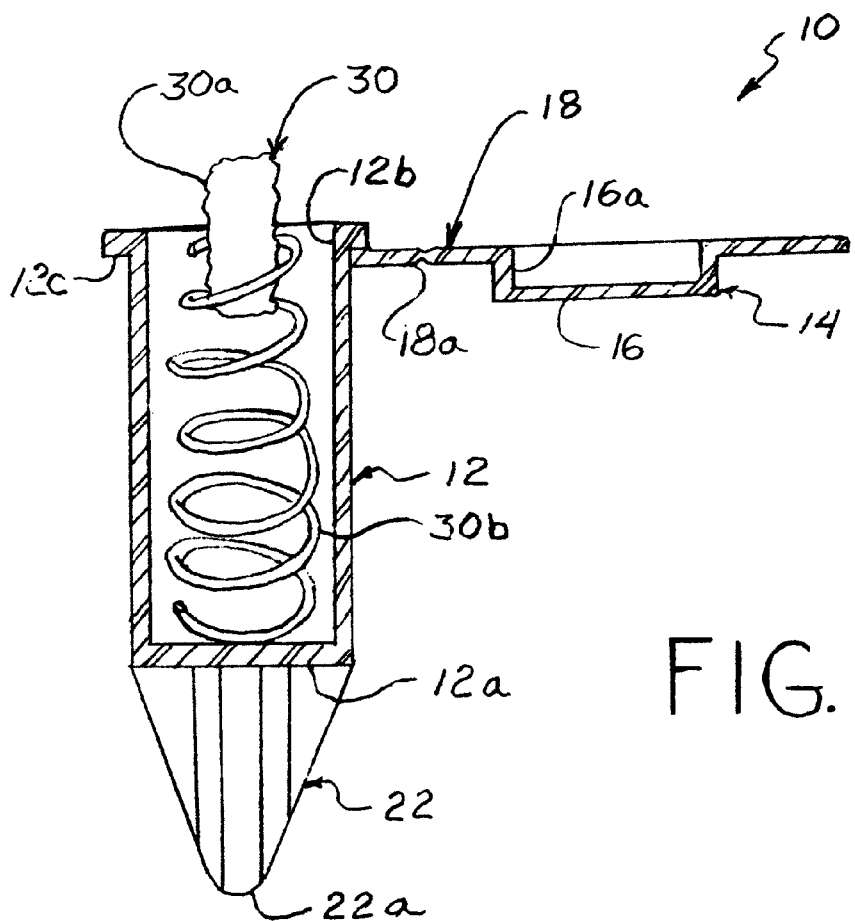
FIG. 3 is a side elevational view, in cross-section, of the unitary container for a game hunting lure as shown in FIG. 1.

A connector 18, integrally formed with the body member 12 and the closure mechanism 14, provides for the permanent interconnection of the body member to the closure mechanism (see FIGS. 2 and 3). The connector 18 includes a hinge 18a, which may be of the type commonly referred to as a living hinge due to its flexibility about its mid-line.

Also integrally formed with the closure mechanism 14, substantially opposite the connector 18, is a hanger member 20. The hanger member 20 enables the unitary container 10 to be located at a desired elevation, such as from a tree limb, when the hunting lure is set out as described below. Although the hanger member 20 is preferably formed in the shape of a hook, it may have any other configuration suitable for hanging the unitary container 10 at a desired elevational location. Of course, according to this invention, the hanger member 20 can be integrally formed with any other suitable portion of the unitary container 10.

Figure 4:
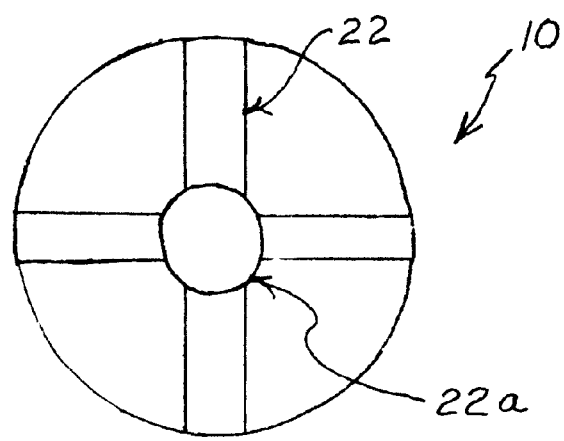
FIG. 4 is a bottom plan view of the unitary container for a game hunting lure as shown in FIG. 1.

Further, a stand mechanism 22 is integrally formed as part of the unitary container 10. The purpose of the stand mechanism 22 is to enable the unitary container to be set out at any desired ground location. The stand mechanism 22 is preferably formed as a spike 22a extending downwardly from the closed end 12a of the body member 12 (see FIGS. 2 and 4). The spike can be driven into the ground at the desired location to effectively position the hunting lure as described below.

The unitary container 10, according to this invention is formed of any suitable, well known, plastic material, which is capable of standing up to outdoor environmental conditions. Further, the plastic material must be capable of being formed into the finished unitary container 10 substantially as one piece. For example the, unitary container may be formed by an injection molding process, or may be formed as several pieces which are suitably welded together to form the integral unit. The important end result according to this invention is that the finished hunting lure container (i.e., the housing, closure, hanger, and stand) be of a one piece construction. This enables the unitary container to be easily handled, readily set out in the hunting environment with a minimum of handling and no field assembly, without the possibility of losing various pieces, as would be the case with multi-piece containers.

With the unitary container 10 for a hunting lure, as described according to this invention, the use thereof is as follows. A typical lure 30 includes a [scented] pad 30a placed in the smaller end of a tapered coil spring 30b (see FIG. 3). The tapered coil spring is selected to have a diameter such that the larger end thereof is about the same diameter as the housing of the body member 12 of the unitary container 10. As such, the spring 30b will be readily retained within the housing. The lid of the closure mechanism 14 to force the pad 30a within the housing of the unitary container where it is sealed for ease of carrying purposes. At the desired outdoor game site, the lid is opened and the spring 30b will cause the scented pad 30a to pop up and be exposed. The unitary container is then placed at a desired location by using the integral hanger member 20 or the stand mechanism 22. That is, the container with the scented pad exposed can be hung from a tree limb or secured in the ground as desired.

The hunting lure unitary container 10 may additionally be provided with indicia to enable the distinction of one container from another. For example, the containers may be of different colors. This provides the advantage of enabling differing color containers to be set out at spaced locations given distances apart. In this manner, the user will be able to tell, by observing the particular color of a container, the distance to any game attracted to such particular container.

The invention has been described in detail with particular reference to preferred embodiment thereof, but it will be understood that variations and modifications can be effected within the spirit and scope of the invention as set forth in the claims.

What is claimed is:

1. A unitary container for a game hunting lure including a pop-up scented pad urged by a spring, said unitary container comprising:

a body member, forming a substantially cylindrical housing having a closed end and an open end, said housing adapted to receive and retain said spring and said pop-up scented pad substantially within said housing;

a lid for selectively closing said open end of said body member housing;

means, integrally formed with said body member and said closure lid, for interconnecting said lid with said housing;

means for hanging said body member at a desired elevated location, said hanging means being integrally formed as an extension of said lid; and means for locating said body member at a desired ground location, said locating means being integrally formed as an extension of said closed end of said housing.

2. The unitary container of claim 1 wherein said interconnecting means includes a hinge of the living type.

3. The unitary container of claim 1 wherein said hanging means includes a hook.

4. The unitary container of claim 1 wherein said locating means includes a spike.

5. The unitary container of claim 1 wherein said body member includes an indicia for enabling distinguishing between unitary containers.

6. The unitary container of claim 5 wherein said indicia includes a color selected from a group of colors.

* * * * *